Patented Dec. 10, 1946

2,412,282

UNITED STATES PATENT OFFICE 2,412,282

TREATMENT OF HYDROPHILIC MATERIAL AND PRODUCT

Richard C. Nelson, Clearwater Beach, Fla., assignor to Essential Oil Producers, Inc., Dunedin, Fla., a corporation of Florida No Drawing. Application March 21, 1944, Serial No. 527,506

14 Claims. (Cl. 252—363.5)

This invention relates to a method for the treatment of hydrophilic material, especially finely divided hydrophilic powders, and to products obtained thereby. More particularly, it pertains to a procedure for the processing of a pectinaceous material, and includes correlated improvements and discoveries whereby a pectin product of enhanced qualities and value results.

An object of the invention is to provide a method for treating a hydrophilic, as a pectinaceous, material, for example, a pectin of citrus origin, in a manner which renders it readily dispersible in water.

An additional object of the invention is the provision of a method for processing hydrophilic material, such as a pectin, in which it is treated with a material that provides a coating thereon which inhibits immediate contact with a solvent, as water, so that dispersion and solution are facilitated.

A further object of the invention is to provide a hydrophilic material with a water-repellent coating in a manner that may be readily, economically and effectively carried out to a desired extent.

Another object of the invention is the provision of a method for coating a pectin with a higher fatty acid, an amide thereof, or an alcohol corresponding, or compatible admixtures of one or more.

A more particular object of the invention is to provide a pectin product soluble in water, of marked dispersibility, and having a coating of a higher fatty acid, or of an amide, or an alcohol corresponding thereto.

Other objects of the invention will in part be obvious and will in part appear hereinafter.

The invention accordingly comprises the several steps, and the relation of one or more of such steps with respect to each of the others, and the composition possessing the features, properties, and the relation of constituents, which are exemplified in the following detailed disclosure, and the scope of the invention will be indicated in the claims.

The invention may be practiced by treating a hydrophilic, as a pectinaceous, material, e. g., a pectin obtained from citrus fruits, with a solution containing a non-solvent for pectin as a solvent and a member of the group consisting of higher fatty acids having a carbon content of 12 to 18, and the amides and alcohols corresponding thereto, as a solute. More especially, a pectin may be suspended in a lower aliphatic alcohol containing a member of the group just above mentioned, followed by a separation of solid from liquid, and subsequent drying.

There is thus produced as an article of manufacture a pectin which is soluble or dispersible in water and which has a coating comprising a member of the aforesaid group. The pectin undergoing treatment may be sensibly dry and in a finely divided condition, as that which results from a spray drying of a pectin solution which may be prepared from various fruits, and especially those of the citrus family. In addition to a pectin the procedure may be employed to advantage for the treatment of other finely divided hydrophilic powders, and mention may be made of other gummous substances of which Irish moss, gum acacia, gum tragacanth, British gum, cedar gum, and Indian gum are examples. For illustrative purposes, pectin will be specifically referred to hereinafter.

As a non-solvent, a lower aliphatic alcohol, as ethyl, n-propyl, isopropyl, and the butyl alcohols, may be utilized, and the concentration may be upwards from about 70%, with a concentration of about 95% having been found to be well adapted as a treating medium. Other non-solvents for pectin may be employed, as ethyl ether, petroleum ether, acetone, and the like. The alcohols are desirable, inasmuch as they are well adapted for the purification of pectin. As higher fatty acids, use may be made of lauric, myristic, palmitic, and stearic, with concentrations as in alcohol ranging from about 1% to the saturation value.

Illustratively, this may be from about 1% to about 2%, with 1.5% being preferred. As above indicated, the amides and the alcohols corresponding to the acids may also be employed, as may compatible admixtures of the acids or amides or alcohols.

The application of the acid, its amide or alcohol, may be, as a constituent of the solvent, e. g., ethyl alcohol, utilized to extract salts and sugars from raw pectin. Preferably the coating substance is used in the ethyl alcohol with which extracted pectin is rinsed. Further extracted pectin may be suspended in a solution of the compound either with or without vigorous agitation. It may be added that in the event that the pectin undergoing treatment is of a type which is imperfectly soluble in water the solubility thereof may be improved by as much as 50% based on its jelly-making capacity through agitation in an alcohol solution of one of the stated compounds. It has been found that the amides are particularly effective in this regard. Moreover, the treatment herein described may be used to particular advantage with a spray-dried pectin, and this is considered to be due to the small size of the pectin particles, of which usually 75% will pass through a 300 mesh sieve.

By way of illustrating the manner in which the invention may be practiced, the following description is given:

A spray-dried pectin in an amount of about 200 grams may be extracted with about 2000 grams of 70% ethyl alcohol. This extracted pectin may now be suspended with stirring in about 200 ml. of a 1.5% solution of stearic acid in 95% ethyl alcohol. Solids are now separated from liquid, e. g., in a perforate basket centrifuge having an 8" diameter spinning at about 500 R. P. M. Following separation, the solids, that is, the pectin composition, may be dried in air with accompanying stirring and slight warming. A sensibly dry, finely divided, pectin composition results, which, when added to water, disperses freely therethrough and then during a period of several minutes, dissolves in the water. This is shown by a gradual increase in the viscosity of the liquid. A pectin, to a certain extent, is difficult to dissolve due to the fact that particles thereof swell so rapidly when placed in water that they may agglomerate and form jelly-like masses which do not readily disperse. This effect becomes more prominent with decreasing particle size, and is especially noticeable with a product which is in the form of a very fine powder. It has been found, as above described, that this difficulty may be overcome when the pectin is washed with alcohol by incorporating in the alcohol used for rinsing a small amount of a higher fatty acid or the amides or alcohols thereof.

When the pectin is subsequently dried the substance, as stearic acid, forms a coating on the pectin particles which is resistant to wetting, thus permitting the pectin particles to be dispersed as a slurry in water before a sufficient amount of water is absorbed to occasion swelling and consequent stickiness.

It is believed that this action is due to the presence of a polar group in the molecule. However, the wetting is not greatly impeded beyond the first few seconds, and solution proceeds readily after the initial delay.

It would seem, therefore, that the solute present in the treating solution should possess the qualities of water repellency and polarity, and this might be occasioned through utilization of a relatively large molecule with a single polar function.

The procedure hereinbefore described results in rendering pectin particles temporarily less hydrophilic so that when they are incorporated with water they disperse throughout the water before becoming wet and swelling, rather than swelling immediately upon contacting the water with an agglomeration into masses which are difficultly dispersible. A pectin so treated makes it possible, as in jelly making, to add the pectin more readily than otherwise. As a result a pectin solution in water is obtained with greater ease and more quickly. An additional advantage is that the small amount of higher fatty acid, e. g., stearic acid, reduces the tendency to foam in jelly-making processes so that less vigilance is required during cooking, and loss attending skimming lowered.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. As an article of manufacture, a pectin in finely divided form with the particles thereof having a coating comprising a member of the group consisting of higher fatty acids with a carbon atom content of 12 to 18, and the amides and alcohols corresponding thereto.

2. As an article of manufacture, a pectin product in finely divided form soluble in water and with the particles thereof having a coating comprising a member of the group consisting of higher fatty acids with a carbon atom content of 12 to 18, and the amides and alcohols corresponding thereto.

3. As an article of manufacture, a finely divided pectin composition soluble in water and with the particles thereof having a coating comprising a member of the group consisting of higher fatty acids with a carbon atom content of 12 to 18, and the amides and alcohols corresponding thereto.

4. As an article of manufacture, a sensibly dry pectin composition in finely divided form with the particles thereof having a coating comprising a member of the group consisting of higher fatty acids with a carbon atom content of 12 to 18, and the amides and alcohols corresponding thereto.

5. As an article of manufacture, a pectin product in finely divided form soluble in water and the particles thereof having a coating of stearic acid.

6. As an article of manufacture, a sensibly dry finely divided pectin composition soluble in water and the particles thereof having a coating of stearic acid.

7. A method for treatment of a hydrophilic gummous substance which comprises suspending a hydrophilic gummous substance in finely divided form in a solution containing a non-solvent therefor having a concentration upwards from about 70%, as a solvent and from about 1% to about 2% of a solid member of the group consisting of higher fatty acids having a carbon atom content of 12 to 18 and the amides and alcohols corresponding thereto as a solute, separating solid from liquid, and subsequently drying so that the particles are coated with the fatty compound.

8. A method for treatment of a pectin which comprises suspending a pectin in finely divided form in a lower aliphatic alcohol having a concentration upwards from about 70% containing from about 1% to about 2% of a solid member of the group consisting of higher fatty acids having a carbon atom content of 12 to 18 and the amides and alcohols corresponding thereto, separating solid from liquid, and subsequently drying so that the particles are coated with the fatty compound.

9. A method for treatment of a pectin which comprises suspending a pectin in finely divided form in ethyl alcohol having a concentration of about 95% containing from about 1% to about 2% of a solid member of the group consisting of higher fatty acids having a carbon atom content of 12 to 18 and the amides and alcohols corresponding thereto, separating solid from liquid, and subsequently drying so that the particles are coated with the fatty compound.

10. In a method for the treatment of a pectin, the improvement which consists in treating a pectin in finely divided form with a solution containing about 1.5% stearic acid in 95% ethyl alcohol so that the particles are coated with the fatty compound.

11. In a method for the treatment of hydrophilic material, the improvement which consists in treating a dry gummous organic hydrophilic material in finely divided form with a solution containing a non-solvent for said hydrophilic material having a concentration upwards from about 70% as a solvent, and from about 1% to about 2% of a solid member of the group consisting of higher fatty acids having a carbon atom content of 12 to 18 and the amides and alcohols corresponding thereto as a solute, so that the particles are coated with the fatty compound.

12. As an article of manufacture, a hydrophilic gummous substance in finely divided form with the particles thereof having a coating comprising a member of the group consisting of higher fatty acids with a carbon atom content of 12 to 18 and the amides and alcohols corresponding thereto, said coated substance being readily soluble in water.

13. A method for treatment of a pectin which comprises suspending a pectin in finely divided form in a solution containing a non-solvent therefor having a concentration upwards from about 70%, as a solvent and from about 1% to about 2% of a solid member of the group consisting of higher fatty acids having a carbon atom content of 12 to 18 and the amides and alcohols corresponding thereto as a solute, separating solid from liquid, and subsequently drying so that the particles are coated with the fatty compound.

14. In a method for the treatment of a pectin the improvement which consists in treating a dry pectin in finely divided form with a solution containing a non-solvent for said pectin having a concentration upwards from about 70% as a solvent, and from about 1% to about 2% of a solid member of the group consisting of higher fatty acids having a carbon atom content of 12 to 18 and the amides and alcohols corresponding thereto as a solute, so that the particles are coated with the fatty compound.

RICHARD C. NELSON.